(12) United States Patent
Smith

(10) Patent No.: US 7,845,314 B2
(45) Date of Patent: Dec. 7, 2010

(54) SUBMERGED COMBUSTION DISPOSAL OF PRODUCED WATER

(76) Inventor: David G. Smith, 9591 N. Bay Dr., Baileys Harbor, WI (US) 54202

( * ) Notice: Subject to any disclaimer, the term of this patent is extended or adjusted under 35 U.S.C. 154(b) by 475 days.

(21) Appl. No.: 11/938,874

(22) Filed: Nov. 13, 2007

(65) Prior Publication Data

US 2008/0110417 A1    May 15, 2008

Related U.S. Application Data

(60) Provisional application No. 60/865,450, filed on Nov. 13, 2006, provisional application No. 60/866,354, filed on Nov. 17, 2006, provisional application No. 60/883,226, filed on Jan. 3, 2007.

(51) Int. Cl.
*F22B 37/48* (2006.01)
(52) U.S. Cl. ................ 122/379; 122/31.2; 126/343.5 R
(58) Field of Classification Search ................ 122/349, 122/31.2, 379; 126/343.5 R; 37/228; 202/164; 237/19; 159/16.2; 60/737
See application file for complete search history.

(56) References Cited

U.S. PATENT DOCUMENTS

| | | | | |
|---|---|---|---|---|
| 2,159,759 A | * | 5/1939 | Doennecke et al. | 126/360.2 |
| 2,418,162 A | | 4/1947 | Cecil et al. | 23/2 |
| 2,468,455 A | * | 4/1949 | Metziger | 23/302 R |
| 2,723,659 A | | 11/1955 | Young et al. | 126/360 |
| 3,060,921 A | * | 10/1962 | Luring et al. | 126/360.2 |
| 3,368,548 A | | 2/1968 | Santoleri et al. | 126/360 |
| 3,452,459 A | | 7/1969 | Champion | 37/229 |
| 3,692,017 A | | 9/1972 | Glachant et al. | 126/360 |
| 3,763,915 A | | 10/1973 | Perry et al. | 159/16 A |
| 3,818,893 A | | 6/1974 | Kataoka et al. | 126/360 A |
| 3,835,909 A | | 9/1974 | Douglas et al. | 159/16 A |
| 3,872,855 A | | 3/1975 | Kawata | 126/271.2 |
| 4,071,966 A | | 2/1978 | Cohen | 37/12 |
| 4,226,034 A | | 10/1980 | Benjamin et al. | 37/12 |
| 4,286,943 A | | 9/1981 | Petlak et al. | 431/352 |
| 4,353,176 A | | 10/1982 | Hess | 37/228 |

(Continued)

OTHER PUBLICATIONS

Tech Notes; "Submerged Combustion"; Section 3, Sheet L-2; Jan. 1990. (4 pp.), Pub Jan. 1990.

(Continued)

*Primary Examiner*—Steven B McAllister
*Assistant Examiner*—Seth Greenia
(74) *Attorney, Agent, or Firm*—Thomas W. Adams; Renner, Otto, Boisselle & Sklar, LLP

(57) ABSTRACT

The present invention relates to a method of disposing of produced water and to a produced water disposal apparatus including a container for receiving and holding produced water; and a burner having a combustion chamber, wherein at least a portion of the combustion chamber is submerged in the water and the submerged portion of the combustion chamber comprises a sparger tube through which combustion gases emerge into, mix with and agitate the water. The present invention further relates to a mechanism for removing debris from the produced water disposal apparatus. In one embodiment, heat is supplied from an externally operated combustion system, rather than the submerged combustion. In one embodiment, the apparatus provides a concentrator, in which a solute can be removed and recovered from an aqueous medium containing the solute.

14 Claims, 3 Drawing Sheets

U.S. PATENT DOCUMENTS

| | | | |
|---|---|---|---|
| 4,397,296 A | 8/1983 | Moore, Jr. et al. | 126/360 A |
| 4,506,656 A | 3/1985 | Baasch | 126/343.5 |
| 4,615,129 A | 10/1986 | Jackson | 37/197 |
| 4,697,572 A | 10/1987 | James et al. | 126/343.5 |
| 4,768,495 A * | 9/1988 | Zifferer | 126/101 |
| 4,846,148 A | 7/1989 | Zifferer | 126/355 |
| 5,235,762 A | 8/1993 | Brady | 37/228 |
| 5,266,220 A * | 11/1993 | Hammond et al. | 210/768 |
| 5,342,482 A | 8/1994 | Duesel, Jr. | 159/DIG. 2 |
| 5,566,231 A | 10/1996 | Sizer, II | 379/142 |
| 5,606,965 A | 3/1997 | Panz et al. | 126/360 A |
| 5,615,668 A | 4/1997 | Panz et al. | 126/360 A |
| 5,636,623 A | 6/1997 | Panz et al. | 126/360 A |
| 5,758,605 A | 6/1998 | Calkins | 122/31.1 |
| 5,791,335 A | 8/1998 | Luciani | 126/343.5 R |
| 5,956,872 A | 9/1999 | Mavrianos | 37/228 |
| 6,223,742 B1 | 5/2001 | Macameau | 126/343.5 |
| 6,736,129 B1 * | 5/2004 | Smith | 126/343.5 R |
| 6,971,238 B1 | 12/2005 | Walker | 60/641.2 |
| 7,416,172 B2 * | 8/2008 | Duesel et al. | 261/77 |

OTHER PUBLICATIONS

Pewag Products; www.pewag.com; Scraper Conveyor Chain. (2 pp.), Printed Oct. 2001.

Trecan Snowmelters; www.trecan/com; (5 pp.), Printed Dec. 2001.

Prab Advantage; Conveyors (2 pp.), Printed Nov. 2001.

* cited by examiner

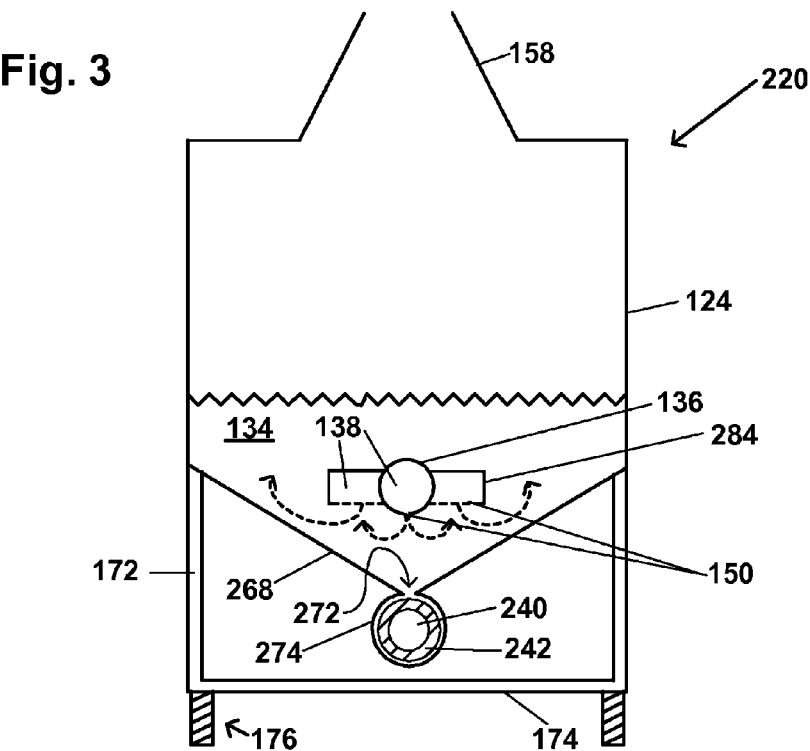
Fig. 3
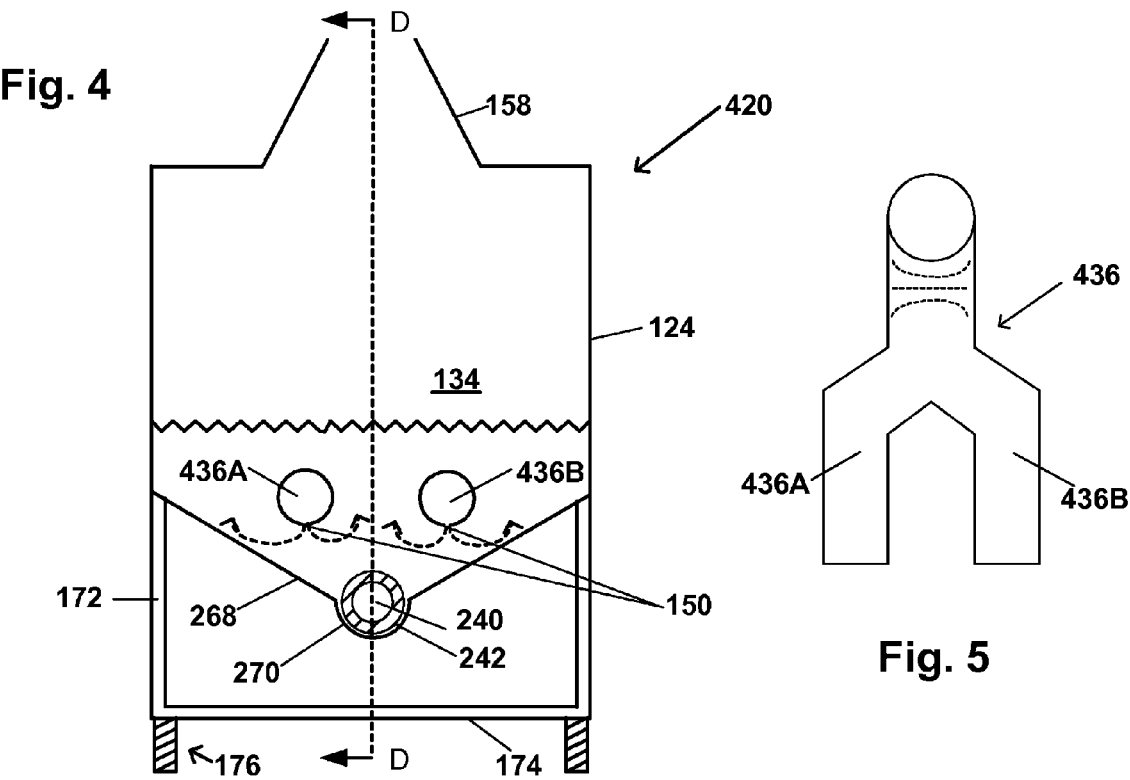
Fig. 4
Fig. 5

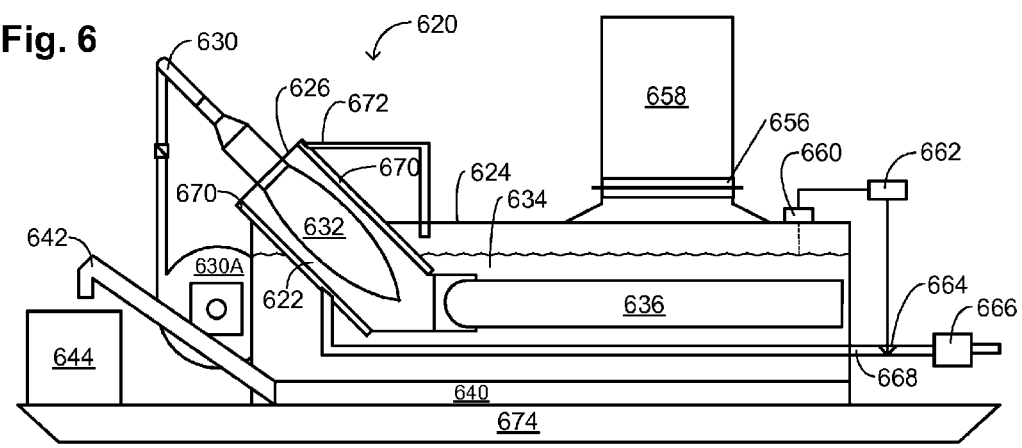
Fig. 6
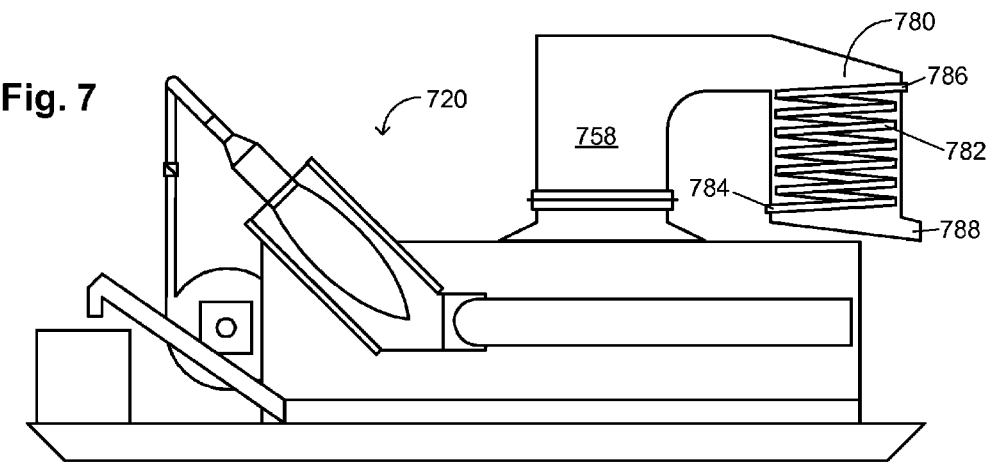
Fig. 7
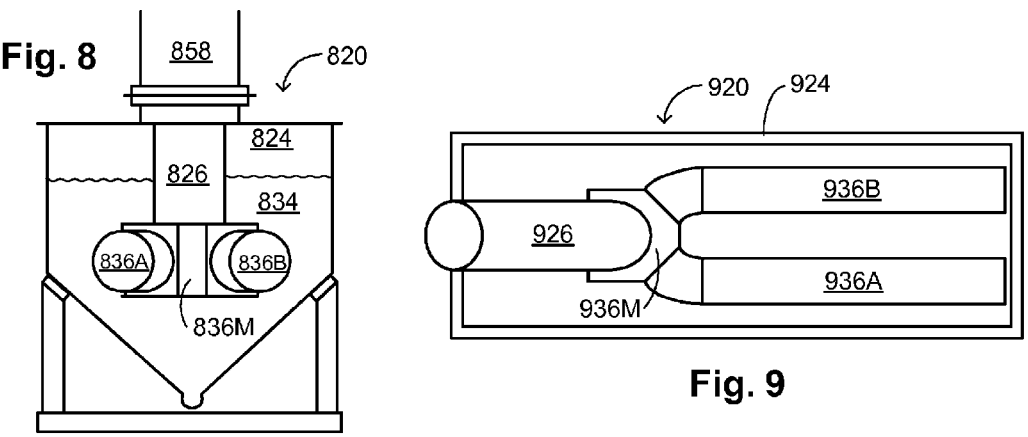
Fig. 8
Fig. 9

SUBMERGED COMBUSTION DISPOSAL OF PRODUCED WATER

CROSS-REFERENCE TO RELATED APPLICATIONS

The present invention is related to and claims benefit under 35 U.S.C. §119 to previously filed, co-ending U.S. Provisional Application No. 60/865,450, filed Nov. 13, 2006, U.S. Provisional Application No. 60/866,354, filed Nov. 17, 2006, and U.S. Provisional Application No. 60/883,226, filed Jan. 3, 2007, the disclosure of each of which is hereby incorporated by reference.

FIELD OF THE INVENTION

This invention relates to an apparatus for disposing of water at the maximum rate and efficiency. More particularly, the present invention relates to a water disposal system including a sparger tube type submerged combustion apparatus, for disposing of water produced, for example, from a hydrocarbon well.

BACKGROUND OF THE INVENTION

Submerged combustion is a method of heating whereby hot products of combustion are forced through a medium to heat the medium. The heat exchange occurs directly between the hot products of combustion and the medium, which may be water or an aqueous solution. In a submerged combustion system, the hot combustion products are generated by a flame fed by a combination of air and a suitable fuel. The flame typically does not actually come into contact with the medium. This technology differs from conventional heat exchange methods such as immersion tube heating where the heat exchange is indirect from combustion products to the tube and through the tube walls to the medium. In conventional heat exchange methods, the spent products of combustion are inefficiently exhausted directly to the atmosphere with useable heat remaining, rather than being efficiently exhausted through the medium and giving up all possible heat, as is possible in submerged combustion.

A problem which exists in hydrocarbon recovery operations, such as oil and gas wells is the production of sometimes large quantities of water together with the desired hydrocarbons, which water must be disposed of in an economical and environmentally friendly way. A great variety of apparatuses and methods have been proposed for disposing of large quantities of water that cannot simply be poured on the ground or into a waterway. Generally these methods have included impoundment and evaporation, use for irrigation of crops, and in some cases active heating or conversion to steam. However, none of these methods efficiently combine high rates of heat transfer from the fuel to the water, as needed to achieve the maximum evaporation rate at the maximum fuel efficiency.

Submerged combustion devices have been applied to the problem of heating water, both for production of hot water per se and for other applications such as melting snow. The submerged combustion devices used in prior art systems often employ a vertical combustor/weir style apparatus having a relatively small coverage area compared to the volume of water to be heated, in which the combustion gases are directed downwardly onto the liquid to be heated.

A weir type submerged combustion device includes two concentric vertical tubes of relatively short length. The tubes are vertically displaced, with the top and bottom of the outer tube (the weir tube) being lower than the respective top and bottom of the inner tube (the combustion tube). This tube system is vertically mounted and is partially immersed in the medium; usually about half the vertical length of the tubes are immersed. The bottom of the outer tube is located above the bottom of the medium container. In operation, the combustion products (hot gases) are directed downward against the surface of the medium in the inner tube. The hot gases are forced to pass downwardly through the medium, around the lower edge of the inner tube and up through the medium in the space between the inner tube and the outer tube. The hot gases entrain the medium and force it to rise in the space between the inner and outer tubes and then over the upper edge of the outer tube. At this point, the partially cooled gases escape upward and out of the device, while the entrained, warmed water flows downward on the outside of the outer tube and into the medium container thus mixing with the remainder of the medium. The only agitation of the medium is that provided by the water flowing into the bottom of the weir and out over the top edge of the outer tube, and so additional agitation must be provided, at additional capital and operational cost.

The weir type of submerged combustion apparatus has a number of shortcomings, in that it fails to completely transfer heat from the combustion gases into the liquid to be heated and so is not optimally efficient. The weir type of submerged combustion fails to achieve complete agitation of the container, and thus does not provide sufficient agitation of the water to rapidly heat and evaporate the water deposited in the apparatus. In addition, the lack of complete agitation results in non-uniform temperature distribution in the water. Thus, additional agitation must be provided from an external mixing device. Without adequate agitation, a problem arises due to the non-uniform distribution of heat in the water. The weir type of submerged combustion is inefficient in transferring combustion heat to water because the close contact of the flame with the water forms water vapor in the combustion chamber. In addition, the full heat of combustion is exposed to only a small fraction of the total water. These effects combine to limit the water evaporation rate into the apparatus to less than what could be had with full agitation and complete and uniform heat transfer.

In the absence of added agitation by an external mixing device, the needed agitation of the water has been left to the often inadequate passive mixing resulting from the water flow through the weir. The lack of agitation directly results in a reduced rate of water evaporation and thus a loss in efficiency of fuel use as well. Other prior art systems include externally applied mechanical mixing devices, thus requiring the input of additional energy as well as provision of the additional equipment.

Due to these problems, such systems for water evaporation have not been widely used. Instead, collection in ponds for passive evaporation is often relied upon despite the adverse environmental effects.

The adverse environmental effects of such produced water have gained the attention of governmental agencies, and have increased the importance of finding economical alternative methods for disposing of such unwanted produced water. Complex systems such as that disclosed in U.S. Pat. No. 6,971,238 have been devised. While such systems may be good at disposing of the water in an environmentally acceptable way, these systems are expensive to build and expensive to operate, and cannot attain the maximum efficiency possibly obtained from the fuel used in the process.

An additional problem in the prior art has been the accumulation and concomitant requirement for removal of sand, mud, salt and other suspended and/or dissolved solids from systems such as those described above. To avoid accumulation of such materials, prior art systems have required that the incoming water be filtered prior to introduction into the system. Such filtering introduces an additional layer of complexity to the system, and adds to the capital and operational costs, as well as providing another source of possible operational interruption as a result of equipment breakdown or for required maintenance.

Removal of such debris is particularly problematical due to the wide variation in size and type of debris. For example, such debris may include sand, gravel, stones, wood, plastics of many shapes and sizes, finely divided organic and inorganic particulates and organic materials such as asphalts and crude oil, which are either inherently present in the water or which are inadvertently collected along with the water. In prior water disposal systems, the entire system must be shut down and the water drained out of the tank or other vessel in order to gain access to and remove the debris collected with the water, if it is not filtered out initially.

In addition to debris, water produced from hydrocarbon wells often includes various hydrocarbons in varying amounts. As the water is evaporated, these hydrocarbons tend to accumulate and must also be collected and disposed of properly.

Therefore, a need remains for an apparatus and method which will rapidly and efficiently dispose of such unwanted produced water and provide for an efficient debris and accumulated hydrocarbon removal apparatus in association with the water disposal.

SUMMARY OF THE INVENTION

In another embodiment, the present invention relates to a produced water disposal apparatus including a container for receiving and holding produced water; a submerged combustion burner; and a debris removal mechanism.

In one embodiment, the present invention relates to a produced water disposal apparatus including a container for receiving, heating and vaporizing produced water; a submerged combustion burner; and a debris removal mechanism.

In one embodiment, the present invention relates to a produced water disposal apparatus including a container for receiving and holding produced water; and a burner having a combustion chamber, wherein at least a portion of the combustion chamber is submerged in the water and the submerged portion of the combustion chamber comprises a sparger tube through which combustion gases emerge into, mix with, agitate and vaporize the water.

In another embodiment, the present invention relates to a produced water disposal apparatus including a container for receiving and holding produced water; a burner having a submerged combustion chamber, wherein the combustion chamber is at least partially submerged in the water and comprises a sparger tube through which combustion gases emerge into, mix with, agitate and vaporize the water; and a debris removal mechanism.

In one embodiment, the debris removal mechanism comprises an auger.

In one embodiment, the sparger tube is branched in a side-arm configuration or in a "Y" configuration, or a combination thereof.

In one embodiment, the present invention relates to a method of disposing of produced water, including providing produced water to a produced water disposal apparatus, wherein the produced water disposal apparatus includes a container for receiving and holding produced water; a burner having a combustion chamber, wherein at least a portion of the combustion chamber is submerged in the water and the submerged portion of the combustion chamber comprises a sparger tube; combusting fuel in the combustion chamber to form hot combustion gases; heating, agitating and vaporizing the water by directly contacting the water with the hot combustion gases exiting the sparger tube; and vaporizing the water.

In another embodiment, the present invention relates to a method of produced water disposal including providing produced water to a produced water disposal apparatus, the produced water disposal apparatus including a container, a submerged combustion burner, a sparger tube and a debris removal mechanism; operating the submerged combustion heating system to heat and vaporize the produced water in the container; and removing debris from the produced water disposal apparatus by means of the debris removal mechanism.

In one embodiment, an apparatus as described herein is used, except that there is no submerged combustion system provided for heating the water to evaporation. Instead, an alternative source of heat, such as the exhaust from a steam boiler, a diesel engine used for generating electricity, the exhaust from a landfill generator, or any other source of useful heat, may be used. In this embodiment, the system includes a source of hot gas, such as combustion gas exhausted from a boiler, and the remainder of the apparatus is as described herein, including, in particular, a sparger tube submerged in the water. The hot gas is passed into the sparger tube and heats the water as described herein.

In one embodiment, the apparatus of the present invention is used as a concentrator, to concentrate a solute by removing water as the solvent, and thereby obtaining the solute in concentrated form. The solute so recovered may be a valuable material in its own right, or it may be a material destined for disposal or treatment, but rendered easier to handle, cheaper and/or easier to dispose than when the solute was in the solvent.

Thus, the present invention relates to a produced water disposal apparatus in which water is disposed of by evaporation and which provides a high evaporation rate and high fuel efficiency. These benefits are attained by use of sparger tube submerged combustion, in which the hot combustion gases produced by the burner are brought rapidly, directly and intimately into contact with the water to be disposed. The hot combustion gases thereby both agitate a large portion or all of the water and obtain nucleate boiling to most efficiently transfer heat from the hot combustion gases to the water. Nucleate boiling provides much greater heat transfer from the hot combustion gases to the water than does conduction or convection heating.

In one embodiment, the present invention further relates to a process of concentrating a solute in an aqueous medium, including providing an aqueous medium containing a solute to a water removal apparatus, wherein the water removal apparatus includes a container for receiving and holding an aqueous medium; a burner having a combustion chamber, wherein at least a portion of the combustion chamber is submerged in the aqueous medium and the submerged portion of the combustion chamber comprises a sparger tube; combusting fuel in the combustion chamber to form hot combustion gases; heating and agitating the aqueous medium by directly contacting the aqueous medium with the hot combustion gases exiting the sparger tube; vaporizing the aqueous medium and concentrating the solute; and recovering the solute in a more concentrated form. Thus in this embodiment, the invention not only removes water, but allows for the collection of the material dissolved in the water or aqueous medium.

Accordingly, the present invention addresses and overcomes the problems of the prior art produced water disposal apparatuses. Additional features and benefits of the invention will be understood from the following detailed description.

BRIEF DESCRIPTION OF THE DRAWINGS

FIG. 3 is a schematic cross-sectional view of another embodiment of the produced water disposal apparatus similar to that shown in FIG. 2.

FIG. 4 is a schematic cross-sectional view of another embodiment of the produced water disposal apparatus similar to that shown in FIG. 2.

FIG. 5 is a schematic cross-sectional view of an embodiment of the sparger tube which may be used in the produced water disposal apparatus, such as that shown in FIG. 4.

FIG. 6 is a schematic side sectional view of a produced water disposal apparatus in accordance with another embodiment of the present invention.

FIG. 7 is a schematic side sectional view of a produced water disposal apparatus in accordance with yet another embodiment of the present invention.

FIG. 8 is a schematic end perspective view of a produced water disposal apparatus in accordance with an embodiment of the present invention similar to the embodiment of FIG. 6.

FIG. 9 is a schematic top plan view of a produced water disposal apparatus in accordance with an embodiment of the present invention similar to the embodiment illustrated in FIG. 6.

Figure 1:
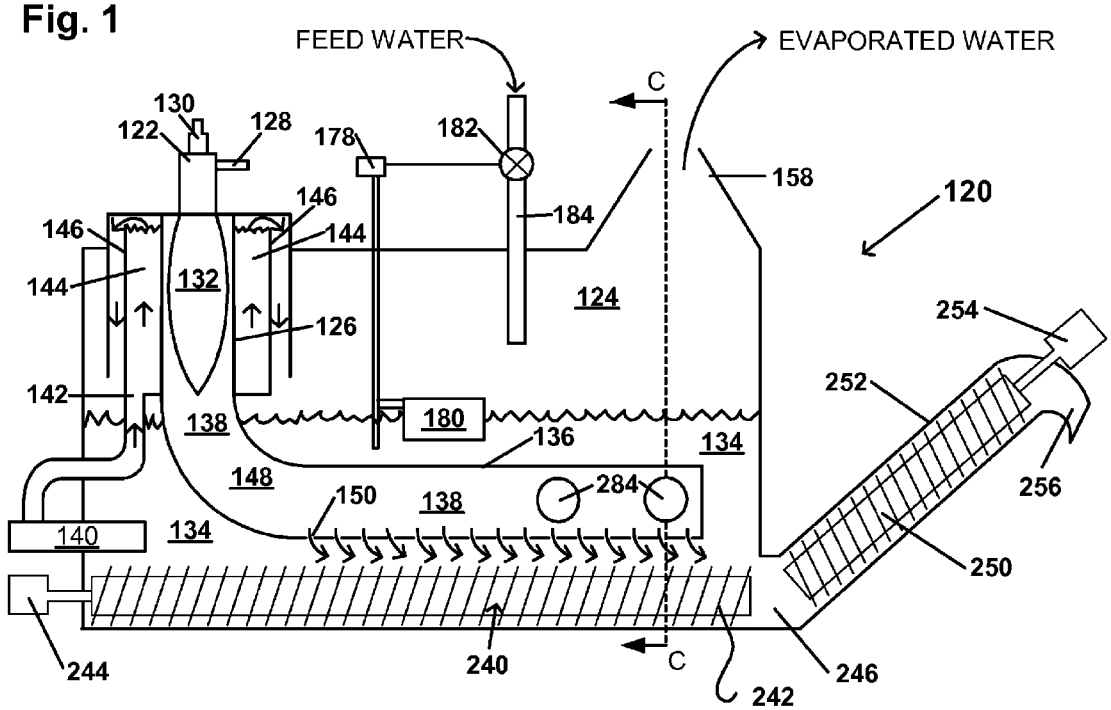
FIG. 1 is a schematic side sectional view of a produced water disposal apparatus in accordance with an embodiment of the present invention.

It should be appreciated that for simplicity and clarity of illustration, elements shown in the Figures have not necessarily been drawn to scale. For example, the dimensions of some of the elements may be exaggerated relative to each other for clarity. Further, where considered appropriate, reference numerals have been repeated among the Figures to indicate corresponding elements.

Furthermore, it should be appreciated that the process steps and structures described below may not form a complete process flow for disposing of produced water. The present invention can be practiced in conjunction with water handling, treatment and processing techniques currently used in the art, and only so much of the commonly practiced process steps are included as are necessary for an understanding of the present invention.

DETAILED DESCRIPTION

As used herein, unless otherwise specifically stated, the term "produced water" includes water produced from a hydrocarbon well, e.g., a gas or oil well, whether land-based or offshore, including water escaping or removed from the well at any stage of production, and further includes any other water from any other source, which water needs to be disposed of and cannot be simply poured on the ground, flowed into a waterway, or otherwise put "down the drain" into a sewage or septic system, for reasons such as toxicity, governmental regulations or for any other reason. This definition thus includes water from sources such as landfill runoff and leachate, water from waste disposal sites such as landfills and waste lagoons, water from areas such as airports or parking lots that, once collected, cannot be disposed of by other conventional, simple methods such as noted above. It is foreseeable that collection of runoff water from paved areas, such as parking lots, may eventually be required by government regulation to be collected and disposed of and/or treated prior to release or discharge. Such water is also included within the scope of the "produced water" as used herein. In one embodiment, landfill leachate or other water sources which may include a volatile toxic or regulated material may be excluded from this definition.

The present invention provides a method of produced water disposal capable of disposing of the water at an optimum rate, i.e., the amount of produced water disposed of per unit of time and energy input to the produced water disposal apparatus is at or near the theoretical maximum. The rate of produced water disposal is optimized by maximizing heat transfer from the burners to the water by means of a sparger tube submerged combustion apparatus. In one embodiment, all water agitation is provided by the sparger. In one embodiment, the apparatus includes an insulated tank. In one embodiment, the apparatus includes the ability to remove debris from the apparatus. These features enable the produced water disposal apparatus of the present invention to operate continuously and at the maximum rate and efficiency. When the tank is insulated, the system is capable of evaporation efficiencies in the range of 1200±50 BTU per pound (2791 kJ/kg) of water removed and the resulting approximately 185° F. (85° C.) saturated plume contains approximately one pound of released water vapor per pound of cooled combustion gases, in accordance with psychometric principles of evaporation. See, e.g., Perry's Chemical Engineer's Handbook.

A first feature of the present invention is the use of a sparger tube for distributing the submerged combustion burner gases evenly throughout the produced water disposal container and for providing agitation of substantially all of the water in the container. The sparger tube provides a very high efficiency of heat transfer from the combustion gases to the water and also provides a high degree of agitation to the water. The sparger tube rapidly delivers the heat to the total volume of the water in the container via nucleate boiling heat transfer.

A second feature is the provision for debris removal from the produced water disposal apparatus. The present inventor has discovered a solution to the long-standing problem of debris accumulation in any kind of produced water disposal apparatus. In the prior art, to avoid the problem, the water for disposal was required to be filtered, a costly and time-consuming procedure, which also requires additional capital equipment. In one embodiment of the present invention, the water for disposal is not filtered. In one embodiment, the water is not treated in anyway prior to its introduction into the apparatus. In one embodiment, the debris removal is by means of an auger. The auger enables the produced water disposal apparatus of the present invention to continue operating without the necessity of periodic shutdowns to clean out the debris.

A third feature is use of insulation of the tank to retain the maximum amount of heat in the water and to avoid radiative loss of the heat imparted to the water. This feature enhances the efficiency of the overall system and method.

An additional feature is a leveling device to maintain a constant level of water in the tank, so that a constant volume of water is maintained in the tank and so that the quantity of new water fed into the tank substantially equals the quantity of water evaporated, thus maintaining a steady-state condition which maintains efficient fuel use in the system.

Additional features of the present invention include one or more of: (a) use of a demister to avoid release of droplets of liquid water from the apparatus; (b) use of a condenser to recover the evaporated water or to avoid release of a plume of water vapor or both; (c) use of a fiberglass tank to avoid corrosion; (d) use of heat treated metal system components, especially those exposed to both chlorides and heat, to avoid stress-corrosion cracking of the metal components; and (e) use of a "Y" or "W" shape sparger tube to allow for adjustments in the size of the container, particularly for enabling transport by truck and use in remote locations. Various other features will become apparent to the skilled person on reading and understanding the disclosure herein.

Another feature of the present invention is that the apparatus can be operated with a source of hot gas, other than a submerged combustion system, such as the exhaust from a diesel or gasoline powered generator, the exhaust from a boiler such as a steam generation boiler, exhaust from a landfill gas-powered generator, or other source of hot gases. Thus, in one embodiment, the system can be operated with what would otherwise be waste heat.

As a result of these features, the produced water disposal apparatus of the present invention optimizes the amount of water disposed of per unit of energy input to the produced water disposal apparatus, thus providing the most efficient possible continuous operation.

Throughout the disclosure of the present invention, including both specification and claims, in all numerical values, the limits of the ranges and ratios may be combined, and are deemed to include all intervening values. All temperatures and pressures are at ambient except where disclosed to be otherwise. Furthermore, in the specification and claims all numerical values are deemed to be preceded by the modifier "about", whether or not this term is specifically stated.

Sparger Tube

The apparatus of the present embodiment includes a sparger tube which provides a high rate of direct heat transfer to the water from the combustion gases, such that the transfer is accomplished with minimum loss of the energy provided by the fuel. This highly efficient, high rate transfer of heat is accomplished by means of submerged combustion with a sparger tube for distributing the hot combustion gases to the water. With sparger tube submerged combustion, little or no loss of heat transfer is encountered, such as due to, e.g., film resistance resulting from use of a conventional heat exchange apparatus, or to inefficient mixing of the hot gases with the water and subsequent escape of only partially cooled combustion gases, as happens with a weir-type submerged combustion system.

The apparatus of the present invention avoids the loss in efficiency of heat transfer inherent in any device which does not include sparger tube-type submerged combustion heating. In sparger tube submerged combustion produced water disposal apparatus, the heat generated by combustion of a fuel is transferred directly into the water. The sparger tube provides both more efficient heat transfer to and agitation of the water. Incoming water is rapidly mixed with the water already in the container, and is rapidly and efficiently evaporated.

The use of sparger tube submerged combustion provides excellent fuel efficiency at or near the maximum theoretically possible. The apparatus of the present invention obtains excellent fuel efficiency in part because the hot combustion gases transfer substantially 98% of the heat contained therein to the water through nucleate boiling. The lack of intermediate devices or barriers between the combustion chamber/hot combustion gases and the water or water means that there is no heat loss and no slowing of the process of heat transfer from the combustion gases to the water.

An additional feature of the present invention which further distinguishes it from prior art devices is that the force of the hot combustion gases exiting the sparger tube and mixing with the water in the container provides highly agitated and thorough mixing of the hot combustion gases with the water for efficient heating of the water. Thus, no separate, additional apparatus for agitation of the water needs to be provided. The temperature and velocity of the hot, i.e., about 2000° F. to about 2600° F. (about 1090° C. to about 1427° C.) combustion gases result in nucleate boiling and strong agitation of the water. The nucleate boiling provides maximum heat transfer rate of heat from the combustion gases to the water. The strong agitation of the water results in uniform vapor release.

A further feature of one embodiment of the present invention is the use of internally recirculated water which is recirculated around the combustion chamber by means of an externally mounted pump. This water is applied to the outside of the portion of the combustion chamber which otherwise would not be submerged in the water container. This feature provides for the maximum amount of the combustion heat to be transferred into the water, as well as keeping the temperature of the combustion chamber walls to a relatively lower temperature.

In one embodiment, the sparger tube is formed in a "Y" configuration, in which the distal or terminal portions of the tube, through which the hot gases escape to mix with and heat the water, is split into two tubes. In another embodiment, the sparger tube is formed in a "W" configuration, in which the distal or terminal portions of the tube, through which the hot gases escape to mix with and heat the water, is split into three tubes. Configurations with higher number of arms are also possible, but may not be practical. These embodiments are quite advantageous in reducing the size of the apparatus for a given heat input, and, viewed another way, for allowing a greatly increased heat input for a given apparatus. In one embodiment, by using a "Y"-shape sparger tube, the size of the apparatus can be reduced to about one-half the size that would be needed for the same heat input. In another embodiment, by using a "Y"-shape sparger tube, the heat input can be increased by a factor of about two, compared to the same apparatus with a single straight (unbranched) sparger tube. In one embodiment, by using a "W"-shape sparger tube, the size of the apparatus can be reduced to about one-third the size that would be needed for the same heat input. In another embodiment, by using a "W"-shape sparger tube, the heat input can be increased by a factor of about three, compared to the same apparatus with a single straight (unbranched) sparger tube.

In one embodiment, the sparger tube is branched in a side-arm configuration or in a "Y" configuration, or a combination thereof. That is, the sparger tube may be in a "Y" configuration and each of the arms of the "Y" may include further, laterally extending branches, as described herein. The "Y" or "W" or higher configuration of the sparger tube enables the length of the overall apparatus to be reduced while allowing for dispersal of the same amount of heat to the water. As will be understood, using the "Y" or "W" configuration may necessitate in increase in the width of the container.

In one embodiment, the present invention includes insulation of the water tank, which avoids loss of heat to the environment, thereby the maximum amount of the heat of combustion is applied to evaporation of the water, and a minimum amount is lost.

In one embodiment, instead of a submerged combustion system, the apparatus of the present invention is heated by a hot gas obtained, for example, from the exhaust of a diesel or gasoline engine, e.g., where the engine is part of an electric generator, or from a steam generating boiler, or from a landfill gas-fired generator. The exhaust from other systems can be used, as long as the hot gas provided is sufficiently hot to obtain an adequate rate of water disposal. In this embodiment, the remainder of the apparatus is as described herein, including, in particular, a sparger tube submerged in the water. The hot gas is passed into the sparger tube and heats the water as described herein. In this embodiment, there is provided a produced water disposal apparatus including a container for receiving and holding produced water; a source of hot gas; a sparger tube operatively communicating with the source of hot gas and through which the hot gas emerges into, mix with, agitate and vaporize the water, in which the source of hot gas provides a gas at a temperature and in a volume sufficient to vaporize the water at a rate comparable to a system including a submerged combustion burner. That is, in this embodiment, the source of hot gas should provide the hot gas at a temperature and in a quantity or volume sufficient to vaporize the water to be disposed at a rate that is within an order of magnitude of that provided by a submerged combustion system as described herein.

Use As a Concentrator

In one embodiment, the water disposal apparatus of the present invention may be used as a concentrator, to remove water and thereby increase the concentration of a solute. The solute may be the "gunk" contained in the produced water of a natural gas well, or it may be a more valuable commodity, such as the salts, ethylene glycol, propylene glycol or other materials used for deicing objects such as aircraft, streets, runways, etc. In many situations, a material of importance is found dispersed in a large volume of water, and needs to be separated from the water to obtain whatever value the material has, or to enable disposal of the material as other than a hazardous waste or pollutant. In the prior art, such separation has been carried out by less efficient, more costly methods, or the large volume of water had to be treated as a whole as a hazardous material. The present invention provides a highly efficient water removal apparatus that essentially doubles as a concentrator of the material in the water. Thus, for example, in aircraft deicing operations, ethylene glycol and/or propylene glycol are often used. The combination of these materials with the snow or ice melted thereby result in the formation of a usually dirty, diluted form of these materials. Due to their possible toxicity and environmental hazard, the glycol-laden dirty water cannot be simply run into the nearest creek, river, lake or onto the ground. This water must be collected and somehow treated. By use of the apparatus of the present invention, the water can be removed and, if desired, recovered, and the material carried by the water can also be removed and collected either for further treatment and recovery or disposal or other waste handling.

Debris Removal

In one embodiment, the present invention provides for removal of debris from the produced water disposal apparatus. In one embodiment, the produced water disposal apparatus includes an apparatus for debris removal.

In one embodiment, the debris removal is by an upwardly open-faced screw auger saddled in a half pipe at the bottom of a substantially V-bottomed vessel. The half pipe may have about the same inside diameter as the outside diameter of the screw auger. The half pipe may be simply laid or attached in the bottom of a V-bottomed vessel, or may be built into the structure, so that the V-shape vessel has a slightly rounded bottom-most portion. The V-bottom vessel is relatively simple and the screw auger can simply be placed inside it.

In one embodiment, the debris removal is by a screw auger saddled in a full pipe having slots cut into the top of the pipe and communicating with a narrow slot in the bottom of a substantially V-bottomed vessel. The pipe may have about the same inside diameter as the outside diameter of the screw auger. The pipe may be simply attached in the bottom of a V-bottomed vessel, or may be built into the structure, so that the V-bottomed vessel has a relatively narrow open slot along the bottom of the V, at which point the pipe is connected. As described in more detail below, the pipe may have a plurality of longitudinally extending slots communicating with the open slot along the bottom of the V.

In one embodiment, the V-bottom vessel simply has the screw auger placed near the bottom of the V, and the screw auger is not inside any additional pipe or other container.

In an alternate embodiment, the debris removal is by a chain apparatus in which the container is a flat-bottom vessel. The chain apparatus provides a simple mechanism for removal of debris which settles to the bottom of a flat bottom container embodiment of the produced water disposal apparatus, in an embodiment in which the bottom is flat. The chain apparatus may have any suitable configuration. In addition to the debris removal from the bottom of the container, any material which floats to the surface and collects there may be removed by actively skimming or by providing a passive weir type skimmer.

As noted above, water produced from hydrocarbon wells often includes various hydrocarbons in varying amounts. As the water is evaporated, these hydrocarbons tend to accumulate and must also be collected and disposed of properly. As will be understood, hydrocarbons have a density lower than water, so will float on the surface of the water. As the hydrocarbons accumulate, they can interfere with efficient vaporization of the water. In one embodiment, the apparatus includes a weir over which the accumulated hydrocarbons can pass, to be collected in a separate section of the apparatus. In one embodiment, the weir is located at a level about 5-15 cm. above the normal water level, as maintained by a water level control system for normal operations. In this embodiment, when accumulated hydrocarbons need to be removed, the water level can be adjusted upward so that the accumulated hydrocarbons pass over the weir. In another embodiment, the weir is located at or near the normal water level. In these embodiments, in addition to the hydrocarbons, there will be a quantity of water passing over the weir, and it will need to be returned to the main tank. In one embodiment, a separation device and a pump or other suitable means is provided for separating and returning the water to the tank. Other suitable means may be selected and provided for collecting the hydrocarbons.

EMBODIMENTS ILLUSTRATED IN THE DRAWINGS

Figure 2:
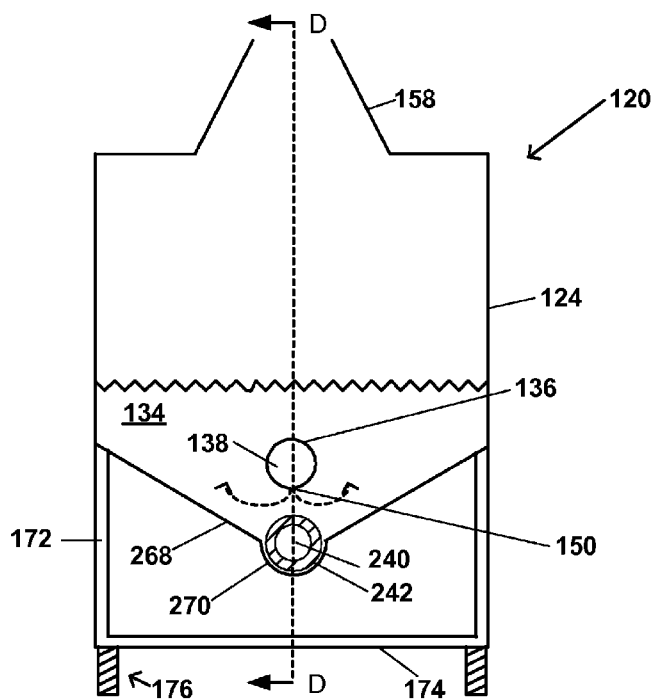
FIG. 2 is a schematic cross-sectional view of the produced water disposal apparatus of FIG. 3 taken at line C-C of FIG. 1.

Referring now to FIGS. 1, 2 and 3, there is shown a produced water disposal apparatus 120 in accordance with an embodiment of the present invention. FIG. 1 is a schematic cross-sectional view of an embodiment of the produced water disposal apparatus, taken at line D-D of FIG. 2. FIG. 2 is a schematic cross-sectional view of this embodiment of the produced water disposal apparatus, taken at line C-C of FIG. 1. FIG. 3 is a schematic cross-sectional view of another embodiment of the produced water disposal apparatus, similar to FIG. 2.

Referring to FIG. 1, there is shown a produced water disposal apparatus 120 in accordance with an embodiment of the present invention. The produced water disposal apparatus 120 includes at least one burner 122, a container 124, and a combustion chamber or tube 126. As illustrated in FIG. 1, the burner is mounted substantially vertically. In other embodiments, the burner may be mounted at an angle, ranging from the depicted substantially vertical to a substantially horizontal position. In one embodiment, the burner is mounted at an angle ranging from about 30 degrees to about 60 degrees, and in another embodiment, the burner is mounted at about a 45 degree angle. Any such angle may be suitably selected. The burner 122 may be a conventional multi-fuel burner. The burner 122 includes a fuel line 128 through which fuel is provided to the burner 122, and an air line 130, through which combustion air is provided to the burner 122. Suitable blower, fan or other air-providing apparatus may be used to provide the combustion air. When the fuel is burning, a flame 132 is directed into the submerged portion of the combustion chamber 126. As noted above, in another embodiment, two or more burners may be included in a single apparatus 120. The container 124 contains water 134. The water 134 is the water for disposal, e.g., the produced water.

The burner used in the present invention may be operated on any of several different fuels. The burner may use untreated wellhead gas, natural gas, LP gas, propane, butane, diesel oil, kerosene, gasoline, heating oil, or other hydrocarbon fuel. In one embodiment, the burner of the present invention is operated on propane. For environmental reasons, a fuel such as propane, butane, natural gas or LP gas may be preferred. For mobile applications, No. 2 diesel fuel may be preferred, particularly when the vehicle operates on the same fuel. In one embodiment, the produced water is from a petroleum well, such as a gas well, and the fuel used in the burners is the petroleum, e.g., wellhead gas, obtained directly from the well. In one embodiment, the wellhead gas is not treated prior to its use as fuel for the burner of the present invention. In one embodiment, the wellhead gas is treated to remove one or more of carbon dioxide, water, sulfur, natural gas liquids, oils or other condensates. Since the natural gas liquids and oils, at least, are combustible, in one embodiment, these are not removed from the wellhead gas when it is used as the fuel. In one embodiment, the wellhead gas is treated to a degree required to convert it to a pipeline quality gas. In one embodiment, the wellhead gas is treated with an "iron sponge" apparatus, as known in the art. The "iron sponge" primarily removes sulfur compounds (such as hydrogen sulfide, mercaptans and sulfides) to "sweeten" the gas, but may also remove some water, when present. In one embodiment, the wellhead gas is treated according to the methods disclosed in U.S. Pat. No. 4,435,371, both in the background section and in the detailed disclosure of the invention, the disclosures of which relating to such treatment methods is incorporated herein by reference.

In one embodiment, the produced water disposal apparatus of the present invention is operated with hot gases obtained from a source other than the submerged combustion burner described herein. In one such embodiment, the apparatus is operated with combustion gases obtained from any high-temperature operation, such as a boiler flue, engine exhaust, a steam turbine in an electrical generation facility, combustion gases in a landfill-gas fueled generator, or any source of waste heat in which the waste heat-carrying gas has a temperature of at least about 700° F. (at least about 370° C.). Of course, the higher the temperature of the waste heat-carrying gas, the better, since it is the total heat content that is important, and more concentrated heat is better in that a smaller volume is needed to obtain a given quantity of heat.

Each burner 122 is mounted on the apparatus 120 is a position in which the combustion chamber is at least partially submerged in the water 134 in the container 124, as illustrated in FIG. 1. The combustion chamber may be water-jacketed as shown in FIG. 1 and described in more detail below. In one embodiment, the combustion chamber is oriented at an angle of about 45° to horizontal, as shown in FIGS. 6 and 7 and described in more detail below.

The apparatus 120 further includes at least one sparger tube 136 connected to each burner 122 and combustion chamber 126. The sparger tube 136 is completely submerged in the water 134. Other mounting configurations of the burner 122 and the combustion tube 126 may be used as needed, and are within the scope of the present invention. However, the most efficient operation is obtained when at least a substantial portion of the combustion chamber 126 and all of the sparger tube 136 are submerged in the water 134. The sparger tube 136 should be mounted horizontally.

As the fuel is consumed, the combustion flame 132 emanates from the burner 122 into the combustion chamber 126, and generates hot combustion gases 138. The hottest part of the combustion gases 138 obviously are near the flame in the combustion chamber 126. As the hot combustion gases move away from the flame 132, heat is transferred to the water surrounding the submerged apparatus and the sparger tube 136. The heat transfer is primarily via holes in the sparger tube, as illustrated in FIGS. 1-3. Some amount of heat will also be transferred by conduction through the walls of the combustion chamber and sparger tube, but the primary heat transfer is from the combustion gases exiting the sparger tube, as shown in the drawings.

In one embodiment, shown in FIGS. 1 and 3, the sparger tube 136 includes additional, laterally extending sparger tube arms 284. The arms 284 extend laterally, horizontally, outward from the main sparger tube 136.

In one embodiment, shown schematically in FIGS. 4 and 5, a water disposal apparatus 420 in accordance with another embodiment of the present invention includes a "Y" configured sparger tube. As shown in FIG. 4, the apparatus 420 includes a sparger tube 436 is formed in a "Y" configuration, in which the distal or terminal portions of the tube 436, through which the hot gases escape to mix with and heat the water, is split into two tubes 436A and 436B. FIG. 4 is a view similar to that shown in FIG. 2, and the components thereof having the same reference numerals are substantially the same as those shown in FIG. 2. Although a "Y" configuration in the apparatus 220 in FIG. 3 is not shown separately, such a combination may also be used and is within the scope of the invention. Similarly, the sparger embodiment of FIG. 3 may be used with any other embodiment of the present invention.

FIG. 5 is a schematic top plan view of the sparger tube 436, showing an embodiment in which the sparger tube 436 has a "Y" configuration in the distal ends 436A, 436B of the sparger tube, similar to the sparger tube 436 shown in FIG. 4. The exact configuration of the "Y" configured sparger tube may be adjusted as needed for a particular application or use. Thus, in various embodiments, the sparger tube may be branched in a side-arm configuration or in a "Y" configuration, or a combination thereof. Although not shown, in the combination, the sparger tube is in a "Y" configuration and each of the arms of the "Y" include one or more laterally extending branches, as described herein in the embodiment shown in FIGS. 1 and 3, except that the sideways branching is on the arms of the "Y".

In one embodiment, the produced water disposal apparatus 120 further includes a recirculation pump 140 and a transfer line 142 which pumps a portion of the water 134 into a contact space 144 surrounding the outside of the combustion chamber 126, then over a weir 146 and back into the main body of the water 134. As illustrated in FIG. 1, the recirculation pump and/or the motor driving the recirculation pump may be externally mounted. While it is possible the recirculation pump and/or the motor driving it could be mounted within the water container, it would be subjected to the high temperature of the heated water, which could be detrimental to the pump and electric motor operating it. In one embodiment, the motor is externally mounted and the recirculation pump is within the confines of the container, in the water. This pumping of a portion of the water around the combustion chamber 126 keeps the combustion chamber relatively cool and allows transfer of some heat from the hot combustion gases 138 passing through this portion of the burner 122 to the water 134 in the contact space 144. Provision of this additional contact space 144 also prevents loss of radiant heat from the portion of the combustion chamber 126 which is not actually submerged, i.e., below the liquid level of, the water 134 in the container 124. The remainder of the combustion gases 138 pass through an area reduction or transition zone 148 into the sparger tube 136. The sparger tube 136 includes a plurality of exit ports 150. The hot combustion gases 138 pass through the exit ports 150 to be mixed with, to transfer heat to, and to agitate the water 134. The combustion gases exiting the exit ports 150 are schematically depicted in FIGS. 1-3 by the dashed-line arrows emanating from the ports 150. In one embodiment, the apparatus 120 does not include the additional contact space 144.

As shown in FIG. 1, each sparger tube 136 is mounted such that its longitudinal axis is oriented generally horizontally. In the illustrated embodiments, the exit ports 150 are disposed on the lower side of the sparger tube 136 and of the outwardly extending arms 284, so that the hot combustion gases 138 are forced to pass in a radially downward direction in exiting from the sparger tube 136 and arms 284, thus providing maximum contact with the water 134. In one embodiment, the exit ports 150 are in the form of a plurality of slits. In another embodiment, the exit ports 150 may be in the form of holes, e.g., round or elliptically shaped openings, rather than slits. In the embodiment shown in FIG. 1, the exit ports 150 are placed on the lowest portion of the sparger tube 136. In other embodiments, the exit ports 150 may be placed elsewhere on the sparger tube 136, so that the combustion gases 138 would pass radially outward to the side and down or simply to the side. While it is possible to have these or other orientations of the exit ports 150, such orientations may provide less thorough contact between the hot combustion gases 138 and the water 134 in the container 124, and therefore may provide less efficient heat transfer to and less agitation of the water. For this reason, these embodiments are less preferred than embodiments in which the exit ports 150 provide a downwardly oriented exit from the bottom of the sparger tube 136. Viewed from the side, downwardly oriented includes any orientation that is below the horizontal plane across the sparger tube.

The hot combustion gases 138, by the time they arrive in the sparger tube 136, may have a temperature in the range from about 800° C. to about 1650° C. In one embodiment, at least a portion of the hot combustion gases 138 in the sparger tube 136 may have a temperature in the range from about 1200° C. to about 1500° C. In one embodiment, at least a portion of the hot combustion gases 138 in the sparger tube 136 have a temperature of about 1400° C.

As the hot combustion gases 138 pass from the sparger tube 136 through the exit ports 150 into the water in the container 124, the temperature of the combustion gases 138 rapidly drops as the heat content of these gases is transferred to the water 134 via nucleate boiling. As the combustion gases 138 mix with and give up their heat to the water 134, the temperature of the combustion gases drops to about the temperature of the water 134. During this process, water will be vaporized and mixed with the cooled combustion gases to form the saturated exhaust effluent which is expelled via a duct 158, by which the produced water is disposed of to the atmosphere as a vapor.

As shown in FIG. 1, the produced water disposal apparatus 120 further includes a level control device 178 including a water level sensor 180. The level control device 178 is mounted so that the sensor 180 is in contact with the water 134, in order to provide water level data to a flow controller 182. The flow control valve 182 is programmed to control the flow of water into the container, as delivered by a water feed line 184. The flow control valve 182 may include, e.g., a bypass valve, in which a relatively constant flow of water is provided, and the flow control valve 182 operates to allow a sufficient portion of the flow needed to maintain a constant level to enter the container and the remainder to be returned to the source. Under the control of the control device 178, the flow control valve 182 allows an appropriate amount of water to pass through the water feed line 184 to maintain the water level in the tank 124 at a substantially constant level. As will be recognized, such a system allows for a relatively constant pump operation, a relatively constant line pressure, and therefore the most economical operation with a constantly operating water feed pump.

Referring now to FIG. 2, which schematically illustrates a cross-sectional view of the produced water disposal apparatus 120 shown in FIG. 1, taken along line C-C in FIG. 1, the invention is further described.

Referring now more specifically to FIG. 2, in one embodiment, the produced water disposal apparatus 120 includes a sloped bottom section 268. The sloped bottom section 268 facilitates the movement of mud, precipitated solids and any debris towards the downwardly extending portion 270 of the bottom of the produced water disposal apparatus 120, in which the debris removal mechanism is located.

Referring still to FIG. 2, as described with respect to FIG. 1, hot combustion gases 138 pass from the sparger tube 136 through the exit ports 150 and mix with the water 134. The hot combustion gases 138 mix with the water 134 in the container 124. The cooled combustion gases 138 (shown by the dashed lines emerging from the slits 150 in the bottom of the sparger tube 136 in FIG. 2), together with water vapor, pass up through the medium, and exit the apparatus 120 into the surrounding ambient air through an exhaust duct or port 158, which is described in more detail below.

As shown in FIG. 2, in one embodiment, the container 124 may be mounted on support legs 172. The support legs 172 may be conventional tank support legs, formed of, e.g., I-beams or channel. In one embodiment, the entire produced water disposal apparatus is mounted on the legs 172. In one embodiment, the legs 172 are attached to each other by horizontally disposed, ground-contacting skids 174. In one embodiment, the skids 174 are elevated by feet 176 or other suitable means for providing access for a lifting device. In one embodiment, the lower end of the legs 172 are affixed to the bed of a truck (not shown). The truck bed may be in a flatbed truck or a semi-trailer truck. In one embodiment, the entire produced water disposal apparatus is carried on a mobile vehicle. In one embodiment the mobile vehicle also includes water collection means, such as a sump pump. In one embodiment, the produced water disposal apparatus 120 is mounted on springs or other shock- and/or vibration-absorbing devices, or these may be included as an integral part of the legs 172. The springs may be useful because submerged combustion apparatus may generate harmonic vibrations which the user may wish to damp in order to avoid the vibration.

As schematically shown in FIGS. 1-3, the produced water disposal apparatus includes the vapor exit port 158, which functions as an exit port for the evaporated water/combustion gas mixture to escape from the produced water disposal apparatus 120. The exit port 158 may be any appropriate size. For example, the port 158 may be generally conical, actually truncated conical, and a height as required to direct the water vapor plume away from the apparatus. The configuration should be such that its flow velocity does not carry water, spray, droplets, etc., out of the apparatus. Ideally, only water vapor and combustion gases exit the apparatus via the exit port 158. The exit port 158 may be appropriately configured. The truncated conical configuration acts to improve the flow of water vapor and combustion gases from the container 124. The exit port 158, and the apparatus 120 generally, may include a demister system and/or an exhaust blower and/or a condenser system, as may be needed according to the location of the apparatus 120 and/or according to governmental or other regulations. In one embodiment, the evaporated water passes into a condenser system, in which the water vapor is condensed into the liquid state. The liquid water thus collected is generally free of contaminants and can be disposed of by simply running the stream into a natural body of water, such as a stream, river, lake or ocean.

As schematically shown in FIGS. 1-3, in one embodiment, the produced water disposal apparatus includes a clean-out mechanism which comprises a debris removal mechanism 240. The debris removal system may be either intermittently or continuously operated. As used herein, the term "debris" includes mud, sand, precipitated solids (introduced into the apparatus as either dissolved or suspended solids or otherwise), tarry materials from, e.g., a hydrocarbon well, and any actual particulate debris that may be inadvertently introduced into the apparatus. As used herein, the term "debris removal mechanism" refers to any bulk conveyor suitable for use with the present invention, as described herein. In one embodiment, the debris removal mechanism comprises an auger 240, described in more detail below, which is particularly well adapted to the V-shape bottoms depicted in FIGS. 1-3. In an embodiment in which the tank 124 has a flat bottom, the debris removal mechanism includes an appropriate mechanism, such as a drag chain, as known in the art of debris or sludge removal.

A debris removal mechanism, such as the auger 240, is most useful for the purpose or removing debris (as defined herein) from the produced water disposal apparatus 120. Since varying amounts of debris may be entrained in the water received by the apparatus 120, the removal prevents buildup of such debris.

Referring now to FIGS. 1-3, there are shown two embodiments of a produced water disposal apparatus 120 and 220 in accordance with the present invention. The embodiments illustrated Include an auger-type debris removal device 240. The auger debris removal device 240 includes spiral blades or flights 242, as shown in the Figures. The auger debris-removal device 240 is shown in FIG. 2 in a V-shaped bottom 268, sloping down to a round bottom 270 in which the auger 240 operates. In this embodiment, the round bottom 270 may be fabricated from a half-pipe, having an inside diameter appropriate to the outside diameter of the flights 242 on the auger 240.

Referring now to FIG. 3, there is shown a produced water disposal apparatus 220 in accordance with another embodiment of the present invention. The apparatus shown in FIG. 3 is similar to that shown in FIG. 1 in that it includes the outwardly extending arms 284 on the sparger tube 136, and is similar to that shown in FIG. 2, except in the bottom of the tank. In the embodiment shown in FIG. 3, the apparatus 220 include a V-shaped bottom 268 similar to that in FIG. 2, sloping down to a relatively narrow orifice 272 communicating with a substantially closed round bottom 274 in which the auger 240 operates. In this embodiment, the round bottom 274 may be fabricated, for example, from a pipe having a plurality of longitudinally extending sections removed, and having an inside diameter appropriate to the outside diameter of the flights 242 on the auger 240.

In one embodiment, a pipe is used, e.g., having an outside diameter ranging from about 6 inches to about 12 inches (about 15 to about 30 cm), or larger, in which a plurality of longitudinally extending sections, for example, sections having a length about 2 inches by about 10 inches (about 5 cm×25 cm), spaced apart every 1-3 inches (about 2.5-7.5 cm), along the length of the pipe. In this embodiment, the pipe would be welded to the lower portion of the V-shape bottom, with the slots in the pipe opening into the tank 134. In this embodiment, the auger is mounted inside the pipe as described herein.

In the embodiment shown in FIG. 3, the auger is substantially more isolated from the remainder of the tank 124 than in the FIG. 2 embodiment. The remainder of the apparatus 220 shown in FIG. 3 is substantially similar to the embodiments described with respect to FIGS. 1 and 2. Although not shown, the embodiment of the sparger 136 including the outwardly extending arms 284 may be used with the embodiment shown in FIG. 2, or with any other embodiment of the present invention.

Referring again to FIG. 1, the auger 240 is rotated, e.g., by an electric motor 244 (or other suitable driver) as a suitable rotational velocity. The auger 240 operates by rotating with the spiral blades or flights 242 advancing the debris towards an end portion 246. In the embodiment illustrated in FIG. 1, the apparatus 120 further includes a second auger 250 which is disposed in an external tube 252 and is rotated by a second electric or other motor 254. The auger 250 is in operative communication with the end portion 246 and thereby with the first auger 240. The second auger 250 moves debris (as defined herein) to and discharges it out an exit chute 256, where it may be collected as appropriate to the nature of the debris.

In the embodiment shown in FIG. 1, the auger 240 is horizontally mounted, and is operatively coupled to or transmits collected debris to a second auger 250, which lifts the collected debris above the water line. In one embodiment, the second auger 250 is substantially similar to the auger 240, having flights and rotating so as to move collected debris toward an exit port. In the embodiment shown in FIG. 1, the second auger 250 is mounted in the external tube 252. In another embodiment, not shown, the second auger 250 may be mounted inside the container. Other suitable arrangements may be used for removing debris. For example, where the quantity of debris is expected to be low, the auger 240 may be omitted, the debris allowed to collect, and the apparatus thereafter shut down and manually cleaned.

Referring now to FIGS. 6-9, additional embodiments of the water disposal apparatus of the present invention are described. In the embodiments shown in FIGS. 6, 7 and 9, the combustion chamber is oriented at an angle of about 45° to the horizontal. While other non-right angles may be used, the angle of about 45° to the horizontal provides a good combination of features. In general, the height and length of the apparatus are directly affected by the angle of the combustion chamber. For a given capacity of the combustion chamber and water disposal, when the combustion chamber is vertically oriented, i.e., at 90° as in FIG. 1, the overall height of the apparatus is greater than when the combustion chamber is oriented at an angle such as 45° as in FIG. 6, but the overall length is greater at the 45° orientation. Thus, there is a trade-off between height and length based on orientation of the combustion chamber. In accordance with one embodiment of the invention, the increased length engendered by the 45° orientation is mitigated by the use of the "Y" or "W" shape sparger tube, in combination with the 45° orientation. In this embodiment, there is obtained a combination in which the entire unit can be carried on a highway-capable truck within legal limits for vehicle height, while minimizing the overall length. The angle of the combustion chamber should be great enough that the water remaining in the container does not escape through the combustion chamber when the unit is shut down.

In the drawings in FIGS. 6-9, the views shown may include a combination of cross-sectional views and perspective views. It is intended that the drawings are to illustrate the important features of the embodiments, and it is believed that any person of skill in the art can readily understand what is intended to be depicted, even with the "combination" views.

FIG. 6 is a schematic side sectional view of a produced water disposal apparatus 620 in accordance with another embodiment of the present invention. As shown in FIG. 6, similar to the embodiments described above, this embodiment of the produced water disposal apparatus 620 includes a burner 622, a container 624 for holding the water to be disposed, a combustion chamber 626, a substantial portion of which is submerged in and/or is surrounded by the water to be disposed. The burner 622 is fed by a fuel line (not shown in FIG. 6), an air line 630 fed, in this embodiment, by a blower 630A mounted nearby. The fuel and air are combusted in the combustion chamber 626, forming a flame 632 forming hot combustion gases that are directed into the water 634 and dispersed into the water 634 by the sparger tube 636. As in the other embodiments, the hot gases exiting openings in the sparger tube 636 heat the water for disposal by nucleate boiling, and transfer heat to the water at very high efficiency.

In the embodiment illustrated in FIG. 6, the water vapor produced in the water disposal apparatus exits the container 624 via a duct 658. In one embodiment, the duct 658 is equipped with a mist reduction device 656, to prevent the escape of liquid water droplets from the apparatus. Such liquid water droplets might contain the undesirable components from which the water is intended to be separated, thereby defeating the purpose of the device. Thus, in some embodiments, the mist reduction device 656 is included. The mist reduction device 656 may include a screen, baffles or some type of honeycomb structure or other structure presenting a tortuous path to the exiting water vapor, thereby preventing carryover of liquid water droplets. In the embodiment shown in FIG. 6, the water vapor produced by the water disposal apparatus 620 is simply allowed to escape into the surrounding atmosphere. Since it is substantially pure water, such release is not of environmental concern. Alternatively, the condensed water can be collected and reused, with or without further purification, as may be needed.

In the embodiment illustrated in FIG. 6, a level sensing device 660 is included. The level sensing device may be, for example, an ultrasonic level detector, or it may be a float-type device. The level sensing device 660 is operatively connected to a level control device 662, which may be operated to control the liquid level in the container 624. The level control device 662 may be any suitable such device known in the art. The level control device 662 may be connected to a flow control valve 664 and to a pump 666, mounted to feed incoming water to the container 624.

In the embodiment illustrated in FIG. 6, a debris removal apparatus 640 is included. The debris removal apparatus 640 may be any one of the debris removal apparatuses described herein. In one embodiment the debris removal apparatus 640 is an auger, as described above. In the embodiment illustrated in FIG. 6, the debris removal apparatus 640 feeds the collected debris through a debris exit port 642 and into a debris container 644. The debris collected in the container 644 may be disposed of as appropriate, for example, by confinement, by sequestration or by disposal in a suitable landfill. If the debris contains a sufficient quantity of hazardous waste, it may have to be confined or sequestered, or otherwise treated to remove the hazardous waste. As will be recognized, one of the important features of the present invention is the significant reduction in volume of material that must be treated, e.g., from thousands of gallons of liquid is obtained a few pounds of solid waste.

In the embodiment illustrated in FIG. 6, the feed pump 666 and flow control valve 664 control the flow of incoming water for disposal into a feed line 668. In this embodiment, the feed line 668 feeds the incoming water for disposal to a jacketed space 670 mounted around the burner 626. By use of this, the temperature of the walls of the combustion chamber can be controlled, and the incoming water can be heated. By use of the jacketed space 670, the inner walls of the combustion chamber can be kept at a temperature within acceptable limits, e.g., at temperatures at which the material can both retain its strength and provide a significant amount of heat transfer to the incoming water. In the absence of the jacketed chamber 670 being filled with water, if the combustion chamber wall was formed of metal, it would likely soften and lose its strength. If the combustion chamber wall was formed of a refractory material, less heat transfer would be possible. In one embodiment, a substantial portion of the heating and vaporization takes place in the jacketed space 670. The preheated water and vapor exit the jacketed space 670 through a line 672, which feeds the preheated water and vapor into the container 624. In one embodiment, about 30% of the total heating takes place in the jacketed space 670.

In the embodiment illustrated in FIG. 6, the produced water disposal apparatus 620 is mounted on a skid 674. The skid 674 allows the apparatus to be more easily transported on a flat-bed truck or by rail, and to be moved across the ground to a desired location simply by dragging the apparatus with a suitable vehicle.

FIG. 7 is a schematic side sectional view of a produced water disposal apparatus 720 in accordance with yet another embodiment of the present invention. In the embodiment illustrated in FIG. 7, the apparatus 720 is substantially identical to the apparatus illustrated in FIG. 6, although not all of the components are shown with reference numerals and not all of the components described with respect to FIG. 6 are shown. However, it is intended that the embodiment of the apparatus 720 includes all of the components described above with respect to FIG. 6.

The embodiment illustrated in FIG. 7, in addition to all of the components described with respect to FIG. 6, further includes a condenser 780 mounted with respect to a vapor exit duct 758. The duct 758 is substantially similar to the duct 658, and may include a mist reduction device as well, but differs in that it is connected to the condenser 780. The condenser 780 may be any type of condenser known in the art. In the embodiment illustrated in FIG. 7, the condenser 780 includes a coil 782. The coil 782 includes a coolant inlet 784 and a coolant outlet 786, through which a suitable coolant, such as cold water, is passed. The coolant may be re-cooled by any known method, such as a dry cooler or other method.

By use of the condenser 780, water vapor exiting the apparatus 720 is condensed into liquid water, which may be collected via a condensed water exit port 788. When the apparatus is properly operated, the water condensed in the condenser 780, like the water vapor exiting through the duct 758, is substantially pure and may be used for most any ordinary use or simply disposed of into a suitable waterway or by pumping into the ground. In some situations, the produced water disposal apparatus of the present invention may be used in a remote area where sources of water are limited. Thus, the availability of large quantities of liquid water may be of significant value, and this apparatus is capable of providing such large quantities.

Although a particular condenser 780 is shown in FIG. 7, any known condenser can be used. For example, a tube and shell condenser (similar to that shown) may be used. As another example, a "reverse sparger" may be used, in which a sparger such as that illustrated and described herein is submerged in a suitable body or container of water, so that the water vapor produced by the water disposal apparatus of the present invention can be re-condensed into the body or container of water. The use of a condenser may be desirable in locations at which a plume is not desirable or is not allowed, such as at or near an airport.

In one embodiment, not shown, the duct 758 (or any other duct described herein) may be equipped with an auxiliary fan. The auxiliary fan may be used to help "push" the water vapor out of the duct into the atmosphere or into a condenser. That is, when a condenser is used, the pressure drop between the container and the ambient atmosphere may be increased to such a level that the pressure inside the container becomes sufficiently high that the container may easily develop leaks. Use of the auxiliary fan helps to mitigate any such pressure drop, and thereby acts to "push" the water vapor into the condenser. In one such embodiment, the auxiliary fan adds some atmospheric air to the water vapor. Such addition may be useful to help cool and begin to condense the water vapor into liquid water, as well as to increase its velocity moving through the duct.

FIG. 8 is a schematic end perspective view of a produced water disposal apparatus 820 in accordance with an embodiment of the present invention similar to the embodiment of FIG. 6, and including a "Y" shape sparger tube such as shown in FIG. 5. The embodiment illustrated in FIG. 8 is intended to include any and all elements of the present invention, but only some are described here. In the embodiment illustrated in FIG. 8, the apparatus 820 includes a container 824 which contains water for disposal 834. The apparatus 820 further includes a combustion chamber 826, which feeds into a sparger including a first sparger tube 836A and a second sparger tube 836B, arranged in the "Y" configuration described herein. The sparger tubes 836A and 836B are mounted to a manifold 836M, which both supports the sparger tubes and divides the combustion gases between the two sparger tubes. The embodiment illustrated in FIG. 8 further includes a duct 858 similar to that described above for FIGS. 6 and 7. As shown in FIG. 8, the apparatus 820 may be mounted on a skid 840.

FIG. 9 is a schematic top plan view of a produced water disposal apparatus 920 in accordance with an embodiment of the present invention similar to the embodiment of FIGS. 6 and 8, including a "Y" shape sparger tube such as shown in FIG. 5. The embodiment illustrated in FIG. 9 is intended to include any and all elements of the present invention, but only some are described here. In the embodiment illustrated in FIG. 9, the apparatus 920 includes a container 924 which may contain water for disposal (not shown). The apparatus 920 further includes a combustion chamber 926, which feeds into a sparger including a first sparger tube 936A and a second sparger tube 936B, arranged in the "Y" configuration described herein. The sparger tubes 936A and 936B are mounted to a manifold 936M, which both supports the sparger tubes and divides the combustion gases between the two sparger tubes, similar to the embodiment illustrated in FIG. 8.

Since the apparatus of the present invention is likely to encounter a number of corrosive elements while in use, and in particular, salt and other chemicals used in drilling mud, as well as mud and minerals dissolved from any holding tank in which the water is stored, the apparatus may be manufactured from a corrosion resistant material, such as stainless steel, aluminum, appropriately painted mild steel, fiberglass or other suitable materials. The paint used for mild steel, or for any of the other materials, should be a paint that is resistant to both high temperatures and corrosive, e.g., salty or mineral-rich, aqueous solutions. For example, paints used for ships may meet the requirements for such a system. The paint may be appropriately selected by those of skill in the art.

Method of Produced Water Disposal

The present invention further relates to a method of disposing of produced water. In one embodiment, the method of produced water disposal includes steps of providing water to a produced water disposal apparatus, the produced water disposal apparatus including a container, a submerged combustion heating system and a debris removal mechanism; operating the submerged combustion heating system to heat the produced water in the container; and, as needed, removing debris from the produced water disposal apparatus by means of the debris removal mechanism. In one embodiment, the submerged combustion burner includes a sparger tube for distributing hot combustion gases to and for agitating the water, as described above.

The method of produced water disposal, in one embodiment, includes steps of providing produced water to a produced water disposal apparatus, wherein the produced water disposal apparatus includes: a container for holding and receiving water; a burner having a combustion chamber, wherein at least a portion of the combustion chamber is submerged in the water and the submerged portion of the combustion chamber comprises at least one sparger tube; combusting fuel in the combustion chamber to form hot combustion gases; heating and agitating the water by directly contacting the water with the hot combustion gases exiting the sparger tube; and thereby creating a mixture of saturated water vapor and cooled combustion gas which exits the apparatus, e.g., in a plume.

In one embodiment, the method further includes removing from the produced water disposal apparatus any debris (as defined herein) which may find its way into the apparatus. In one embodiment, the removing step is carried out with a debris removal mechanism, as described above. In one embodiment, the feed water provided to the apparatus is primarily laden with dissolved solids, minerals or organic materials such as tar, and with suspended solids, such as mud. If the water has been retained in an impoundment, the pumps that move the water to the apparatus will generally have some screening or filtering apparatus, to prevent damage to the pump from stones or gravel. Of course, these dissolved and suspended solids accumulate in the tank and need to be removed. In other embodiments, the removing step is carried out by using other known means for removing debris or solid matter from the bottom of a container filled with liquid, such as an auger. Such other methods may also include manually removing or washing out the debris, and may entail first emptying the tank of the water otherwise contained therein.

The method may be carried out with the apparatus mounted on a truck, for example. The truck may be equipped with a pump, including the necessary apparatus for straining and providing the produced water to the produced water disposal apparatus. The produced water disposal apparatus has been described above in detail. In one embodiment, the apparatus may be mounted on a skid, so that it can be transported by truck or other suitable vehicle. In one embodiment, the height of the apparatus is kept to a minimum so that, when mounted on a truck or other vehicle, whether permanently mounted or mounted on a skid carried by the vehicle, the total height of the apparatus is within legal limits. For example, in many areas, the maximum legal limit for vehicle height is 13.5 feet (about 4.1 meter). This limitation may be met, for example, by mounting the submerged combustion burner at a suitable angle away from the vertical mounting illustrated in FIG. 1. For example, the submerged combustion burner may be mounted at about a 45 degree angle, as shown in FIGS. 6 and 7.

In one embodiment, the burner is fired to heat the water to a temperature at which it will quickly evaporate in accordance with known psychrometric principles. In one embodiment, the burner is fired to heat the water to a temperature at which it will quickly evaporate, as suggested above, in one embodiment in the range from about 80° C. to about 100° C., in another embodiment, in the range from about 83° C. to about 90° C., in another embodiment, and in one embodiment, about 84° C. to about 87° C. The evaporated water may be simply vented to the atmosphere or fed to a condenser and collected.

The produced water disposal apparatus of the present invention may be a self-contained unit, including a vehicle, fuel supply, electrical controls, etc., as needed for fully independent operation. The invention is not limited by the means by which it may be transported. In one embodiment, the produced water disposal apparatus is operated at the site of the oil or natural gas production site, i.e., at a producing gas well site, such as on land or, possibly, on an offshore production rig.

In one embodiment, the container 124 has a V-shape bottom 268 leading to a clean-out port, with or without an auger 240. The V-shape bottom may be used to collect debris for removal through the clean-out port. In one embodiment, the clean-out port may be equipped with the auger 240 or some variation thereof for removing debris from the bottom of the container 124 through the clean-out port, which may be, for example, at or adjacent the location of the end portion 246 in the embodiment shown in FIG. 1.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, steps, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as maybe desired and advantageous for any given or particular application. Therefore, it is to be understood that the invention disclosed herein is intended to cover such modifications as fall within the scope of the appended claims and equivalents thereof.

The invention claimed is:

1. A produced water disposal apparatus comprising:
    a container for receiving and holding produced water;
    a feed water line providing produced water to the container;
    a burner having a combustion chamber, wherein at least a portion of the combustion chamber is submerged in the water and the submerged portion of the combustion chamber comprises a substantially horizontal sparger tube having a plurality of exit ports along its length through which combustion gases emerge into, mix with, agitate and vaporize the water; and
    a condenser to condense and recover vaporized water
    a debris removal mechanism comprising an auger; the container further comprises a v-shaped ending with a cylindrical bottom having an inside diameter providing a clearance from an outside diameter of the auger.

2. The produced water disposal apparatus of claim 1 wherein the apparatus is mobile.

3. The apparatus of claim 1 wherein the water is heated in the apparatus to a temperature in the range from about 80° C. to about 100° C.

4. The apparatus of claim 1 wherein the container is insulated.

5. The apparatus of claim 1 wherein the sparger tube is branched in a side-arm configuration, or in a "Y" or "W" configuration, or a combination thereof.

6. A produced water disposal apparatus comprising:
    a container for receiving and holding produced water;
    a feed water line providing produced water to the container;
    a source of hot gas other than a submerged combustion apparatus;
    a sparger tube operatively communicating with the source of hot gas and through which the hot gas emerges into, mix with, agitate and vaporize the water; and
    the sparger tube positioned substantially horizontal and having a plurality of exit ports along its length;
    a condenser to condense and recover vaporized water,
    wherein the source of hot gas provides a gas at a temperature and in a volume sufficient to vaporize the water at a rate comparable to a system including a submerged combustion burner
    a debris removal mechanism comprising an auger; the container further comprises a v-shaped ending with a cylindrical bottom having an inside diameter providing a clearance from an outside diameter of the auger.

7. A method of disposing of produced water, comprising:
    providing produced water to a produced water disposal apparatus, wherein the produced water disposal apparatus comprises:
    a container for receiving and holding produced water;
    a feed water line providing produced water to the container;
    a burner having a combustion chamber, wherein at least a portion of the combustion chamber is submerged in the water and the submerged portion of the combustion chamber comprises a substantially horizontal sparger tube having a plurality of exit ports along its length; and a condenser;

combusting fuel in the combustion chamber to form hot combustion gases;

heating and agitating the water by directly contacting the water with the hot combustion gases exiting the sparger tube; and vaporizing the water; and condensing vaporized water in the condenser and recovering condensed water removing debris from the produced water disposal apparatus with a debris removal mechanism comprising an auger; the container further comprises a v-shaped ending with a cylindrical bottom having an inside diameter providing a clearance from an outside diameter of the auger.

8. The method according to claim 7 wherein the method comprises deploying the apparatus and carrying out the method at or near a producing natural gas well, wherein the produced water is obtained from the natural gas well.

9. The method according to claim 7 wherein the container is insulated.

10. A method of produced water disposal comprising:

providing produced water to a produced water disposal apparatus, the produced water disposal apparatus including a container, a feed water line providing produced water to the container, a submerged combustion burner, a substantially horizontal sparger tube having a plurality of exits ports along its length, a condenser and a debris removal mechanism comprising an auger; wherein the container further comprises a v-shaped ending with a cylindrical bottom having an inside diameter providing a clearance from an outside diameter of the auger operating the submerged combustion heating system to heat and vaporize the produced water in the container;

condensing vaporized water in the condenser and recovering condensed water; and removing debris from the produced water disposal apparatus by means of the debris removal mechanism.

11. A method of concentrating a solute in an aqueous medium, comprising:

providing an aqueous medium containing a solute to a water removal apparatus, wherein the water removal apparatus comprises:

a container for receiving and holding an aqueous medium;

a feed water line providing produced water to the container, a burner having a combustion chamber, wherein at least a portion of the combustion chamber is submerged in the aqueous medium and the submerged portion of the combustion chamber comprises a substantially horizontal sparger tube having a plurality of exit ports along its length; and a condenser;

combusting fuel in the combustion chamber to form hot combustion gases;

heating and agitating the aqueous medium by directly contacting the aqueous medium with the hot combustion gases exiting the sparger tube;

vaporizing the aqueous medium and concentrating the solute;

condensing vaporized water in the condenser and recovering condensed water; and recovering the solute in a more concentrated form by means of a debris removal mechanism comprising an auger; the container comprises a v-shaped ending with a cylindrical bottom having an inside diameter providing a clearance from an outside diameter of the auger.

12. The method according to claim 8 wherein the fuel for the burner is wellhead gas obtained from the natural gas well.

13. The method according to claim 10 wherein the debris comprises mud and precipitated solids.

14. The method according to claim 11 wherein the solute comprises mud and precipitated solids.

* * * * *